(12) United States Patent
Errasquin

(10) Patent No.: US 7,388,043 B2
(45) Date of Patent: Jun. 17, 2008

(54) CROSSLINKING AGENTS ENCAPSULATED IN POLYMERS AND METHODS OF MANUFACTURING THE SAME

(76) Inventor: Mirna Errasquin, 3300 Pebblebrook #83, Seabrook, TX (US) 77586

( * ) Notice: Subject to any disclaimer, the term of this patent is extended or adjusted under 35 U.S.C. 154(b) by 256 days.

(21) Appl. No.: 10/866,860

(22) Filed: Jun. 14, 2004

(65) Prior Publication Data

US 2005/0004319 A1     Jan. 6, 2005

Related U.S. Application Data

(60) Provisional application No. 60/478,090, filed on Jun. 13, 2003.

(51) Int. Cl.
*C08K 9/00*     (2006.01)
(52) U.S. Cl. ..................... 523/205; 523/209
(58) Field of Classification Search ............... 523/205, 523/209
See application file for complete search history.

(56) References Cited

U.S. PATENT DOCUMENTS

| | | | |
|---|---|---|---|
| 3,179,637 A * | 4/1965 | Brodt et al. | 428/402.24 |
| 4,092,285 A * | 5/1978 | Leo et al. | 523/334 |
| 5,010,119 A * | 4/1991 | McElrath et al. | 523/205 |

FOREIGN PATENT DOCUMENTS

| JP | 361129039 A * | 6/1986 | |
|---|---|---|---|

OTHER PUBLICATIONS

B. McFarland et al., "Preparation and Analysis of Peroxide Microcapsules," ACS Polymer Preprints 2004, 45(1), 2 pages.
PolyOne, "PolyBound Polymer-Bound Powders," http://www.polyone.com/prod/prodDataSheet.asp?id=465F961F-080F-42D7-B208-474CE76BCF59, 1 pg.
Product Data Sheet: PolyBound Polymer-Bound Powders—Accelerators, product description at http://www.polyone.com/prod/trade/trade_info.asp?ID={465F961F-080F-42D7-B208-474CE76BCF59}&link=P, 3 pages.
Struktol, "Struktol SU 109, Preparation of Insoluble Sulfur," the Struktol SU 109 description at http://www.struktol.com/pdfs/SU109.PDF, Jul. 23, 1997, 2 pages.
Struktol, "Struktol SU 120, Preparation of Soluble Sulfur," the Struktol SU 120 description at http://www.struktol.com/pdfs/SU120.PDF, Aug. 7, 1997, 1 page.
Struktol—Rubber Products Line—Coated Sulfurs, the Struktol general description from URL http://www.struktol.com/sulfurs.asp, 1 page.

* cited by examiner

*Primary Examiner*—Bernard Lipman
(74) *Attorney, Agent, or Firm*—Osha Liang LLP

(57) ABSTRACT

A composition includes (a) a crosslinking agent comprising; and (b) a resin, wherein the resin is cured to form a polymer network to encapsulate the crosslinking agent. The crosslinking agent may comprises from about 10% to about 90% by weight of the composition, and the resin may comprises from about 90% to about 10% by weight of the composition. A method for controlling a rate of vulcanization includes encapsulating a crosslinking agent in a polymer network; degrading the polymer network to release the crosslinking agent in a controlled manner; and performing the vulcanization.

4 Claims, 2 Drawing Sheets

CROSSLINKING AGENTS ENCAPSULATED IN POLYMERS AND METHODS OF MANUFACTURING THE SAME

CROSS-REFERENCE TO RELATED APPLICATIONS

This claims priority, under 35 U.S.C. § 119(e), of U.S. Provisional Patent Application Ser. No. 60/478,090, filed on Jun. 13, 2003. This Provisional Application is incorporated by reference in its entirety.

STATEMENT REGARDING FEDERALLY SPONSORED RESEARCH OR DEVELOPMENT

Not applicable.

BACKGROUND OF INVENTION

1. Field of the Invention

The present invention relates to crosslinking slow release systems. More particularly, the present invention relates to encapsulation of polymer crosslinking agents to provide a slow release system.

2. Background Art

Crosslinking agents (or more commonly named vulcanization agents) are widely used in several types of polymers (such as rubber) to enhance their mechanical properties. The crosslinking agents (or vulcanization agents) are selected based on the types of polymers. For example, rubber is often vulcanized with sulfur agents. Hard rubber is vulcanized with 30% to 50% of sulfur, and soft rubber typically includes less than 5% of sulfur. The vulcanized rubber is not sticky, does not harden with cold or soften with heat, is elastic, springs back into shape when deformed, is highly resistant to abrasion and to most chemicals, and is a good insulator against electricity and heat.

Chemically, vulcanization involves the formation of cross-linkages between the polymer chains. Using rubber as an example, vulcanization involves mixing sulfur and rubber (and sometimes with an organic accelerator, such as an aniline compound, to shorten the time or lower the heat necessary for vulcanization) and heating the mixture in molds under pressure. Vulcanization can also be accomplished with peroxides, gamma radiation, and several other organic compounds.

Vulcanization is also used in the "curing" of other materials. For example, vulcanization of polymer dissolved in asphalt can enhance the elastomeric properties of the asphalt for use in the paving and roofing industry. While vulcanization improves the properties of such polymer modified asphalt, it is important to control the rates of vulcanization. A typical vulcanization tends to have a fast reaction (initial burst) at the beginning followed by slow reactions during the subsequent, undefined long period of time. The initial burst and the subsequent reactions are not desirable because they tend to form over-vulcanization, leading to thermoset components commonly known in the asphalt industry as "gels." Asphalts that have been over cross-linked are not useful because they no longer have manageable viscosities even with heating.

Similar problems may also occur with the vulcanization of other polymers. In addition, when these polymers and crosslinkers are pre-mixed for storage, it is necessary that the vulcanization be controlled, either by use of controllable crosslinkers or by storing the mixture at sub-ambient temperatures to avoid pre-vulcanization. Otherwise, pre-vulcanization would yield products with poor mechanical properties. Therefore, it is desirable to have methods and products to control the rates of vulcanization in a polymer-crosslinker system.

SUMMARY OF INVENTION

One aspect of the invention relates to compositions for controlled release of crosslinking agents. A composition in accordance with one embodiment of the invention includes (a) a crosslinking agent; and (b) a resin, wherein the resin is cured to form a polymer network to encapsulate the crosslinking agent. The crosslinking agent may comprise from about 10% to about 90% by weight of the composition, and the resin may comprise from about 10% to about 90% by weight of the composition.

One aspect of the invention relates to methods for encapsulating a crosslinking agent in a polymer network. A method in accordance with one embodiment of the invention includes mixing the crosslinking agent with a resin, wherein the resin is an auto cure resin; and curing the resin to form the polymer network.

One aspect of the invention relates to methods for controlling a rate of vulcanization. A method in accordance with one embodiment of the invention includes encapsulating a crosslinking agent in a polymer network; degrading the polymer network to release the crosslinking agent in a controlled manner; and performing the vulcanization.

Other aspects and advantages of the invention will be apparent from the following description and the appended claims.

DETAILED DESCRIPTION

Figure 1:
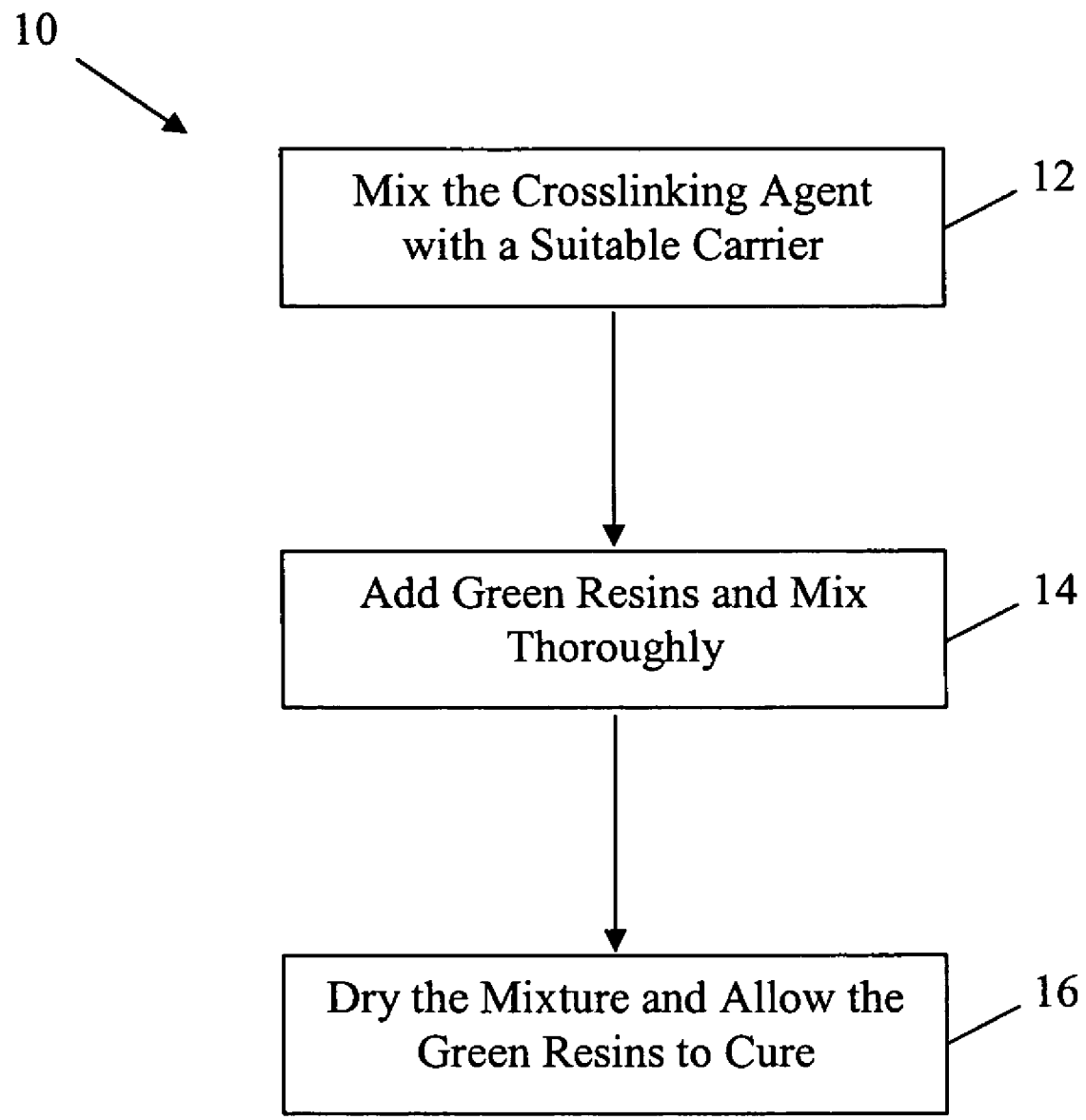
FIG. 1 shows a method in accordance with one embodiment of the invention.

The present invention relates to compositions and methods for polymer vulcanization in a controlled manner. As noted above, uncontrolled vulcanization may yield products of undesirable properties. These problems may be avoided if the vulcanization occurs in a controlled manner. In accordance with some embodiments of the invention, methods are provided such that vulcanization starts slower (i.e., without the initial burst) and can maintain the reaction rates in a more controllable manner.

In accordance with one method of the invention, the "available" concentration of the crosslinker is kept low initially. Because the initial viscosity of the mixture is low, any "available" crosslinkers can react more readily, and, therefore, it is desirable to keep the initial concentration of the "available" crosslinker low in order to avoid the initial "burst." When the reaction progresses, the viscosity of the mixture increases. In accordance with some embodiments of the invention, as the reaction progresses, the "available" concentration of the crosslinker may be permitted to increase (until the crosslinker begins to be depleted) in order to maintain similar reaction kinetics.

In accordance with one embodiment of the invention, the crosslinking agents are encapsulated in a polymer network, such as a thermoset polymer network, that can be degraded by external factors (e.g., temperatures, pressures, or solvents). The polymer network is preferably resistant to moderate temperatures and solvents such that the crosslinking agents are less likely to be released by accident. When the crosslinking agents are needed, the polymer network may be degraded by altering the external factors (e.g., high temperature for thermoset polymer network, or stress or solvents for other polymers). The rate of the release of the crosslinking agents is determined by the rate of degradation of the polymer network. Therefore, one can control the rates of polymer degradation to achieve the desired concentration of the crosslinking agents.

In accordance with one embodiment of the invention, the polymer network that sequesters the crosslinking agents comprises thermoset polymers such that the polymer network may be degraded by high temperatures. Various thermoset polymers can be used for this purpose, such as silicon rubber. The crosslinking agents may be protected and entrapped in silicon rubber (or other thermoset polymers) by any suitable methods, such as by dispersing the crosslinking agents on the silicon rubber before it cures.

The crosslinking agents thus entrapped remain active as precursors of vulcanization when the protective silicon polymer networks are degraded. The silicon polymer protective network can be degraded by raising the temperature above a temperature limit to degrade the polymer network when vulcanization is needed. The release of the crosslinking agents is controlled such that the initial "burst" reaction can be avoided. In addition, the subsequent reaction (after the initial reaction) can be maintained at a rate that produces better vulcanization products. Consequently, embodiments of the present invention can improve vulcanization control and reduce undesired byproduct formation (such as "gel" formation in asphalt) due to under-vulcanization or over-vulcanization.

Encapsulation of the crosslinking agents in silicon rubber may be accomplished with any suitable methods. FIG. 1 shows a method 10 in accordance with one embodiment of the invention. As shown, the crosslinking agent (e.g., elemental sulfur at 99% purity, or any other crosslinking agent) is blended with a suitable carrier or liquid (e.g., water) such that it will be easier to disperse the crosslinking agents in the polymer network (step 12). The crosslinking agent may be any that is commonly used in vulcanization, including sulfur, sulfur donor, peroxide or the like, available from commercial sources such as Akzo Noble, Flexis, Crompton, etc The carrier or liquid is selected for easy dispersion of the crosslinking agent. The carrier or liquid need not dissolve the crosslinking agents (i.e., it can form a suspension or solution), but should not react with the crosslinking agents. The amounts of the crosslinking agents and the carrier phase may be selected for easy mixing. For example, 100 g of sulfur may be mixed 200 g of water. The mixing may use any commercial mixer (blender) that is suitable for the amounts of the materials being mixed. The mixing can be by moderate agitation; there is no need of high speed mixing.

The encapsulation process is then performed by adding green resins (un-reacted) that will form the polymers (step 14). Suitable resins include silicon rubber compounds, acrylic, epoxy or ethylene resins. In preferred embodiments, these resins are auto curable, i.e., they can cure without adding another reagent. The reactive auto curing resins are widely used in various industrial applications. These resins include, but are not limited to, epoxy, acrylic, ethylene, silanols or silicon rubber. These resins may comprise, for example, two components, e.g., a reactive monomer and a reaction promoter. Other suitable resins may include methylsilanetriol treacetate (CAS No. 4253-34-3), distilates (Petroleum) hydrotreated light (CAS No. 64742-47-8), dichlorodimethyl silane, siloxanes, and dimethyl hydroxyl-terminated silicones (CAS No. 70131-67-8).

The mixture is then thoroughly mixed, using, for example, a commercial blender. This step may require more rigorous mixing than the previous step in order to ensure that the mixture is thoroughly mixed. The mixture can then be filtered, if desired, to remove any clumps or residues.

When the mixture is thoroughly mixed, it is allowed to dry and cure (step 16). If an auto cure resin is used, the mixture can simply be allowed to sit at an appropriate temperature for a suitable period of time (depending on the resin) to allow the resin to cure and form a polymer network. If a non-auto cure resin is used, then an appropriate initiator may be added to start the curing process. The initiator may also be added during mixing. The resins and the crosslinking agents are cured "in situ," allowing the formation of a thermoset polymer network that encapsulates the crosslinking agents. The encapsulation prevents the crosslinking reaction from occurring until the thermoset polymer is degraded.

Some embodiments of the invention relate to compositions that include the encapsulated crosslinking agent in a polymer network. The compositions may include asphalt or rubber, in addition to the encapsulated crosslinking agent. The rubber may be natural rubber or synthetic rubber. In this case, the asphalt or rubber may be vulcanized in a controlled manner by controlling the rate of degradation of the polymer network (hence, the available concentrations of the crosslinking agents).

In accordance with some embodiments of the invention, the resins used in the formation of protective polymer network are auto curable resins. With such embodiments, the non-destructive auto cure reaction can often be performed under conditions (e.g., ambient temperature and/or pressure) that do not degrade the reactivities of the crosslinking agents being encapsulated.

Figure 2:
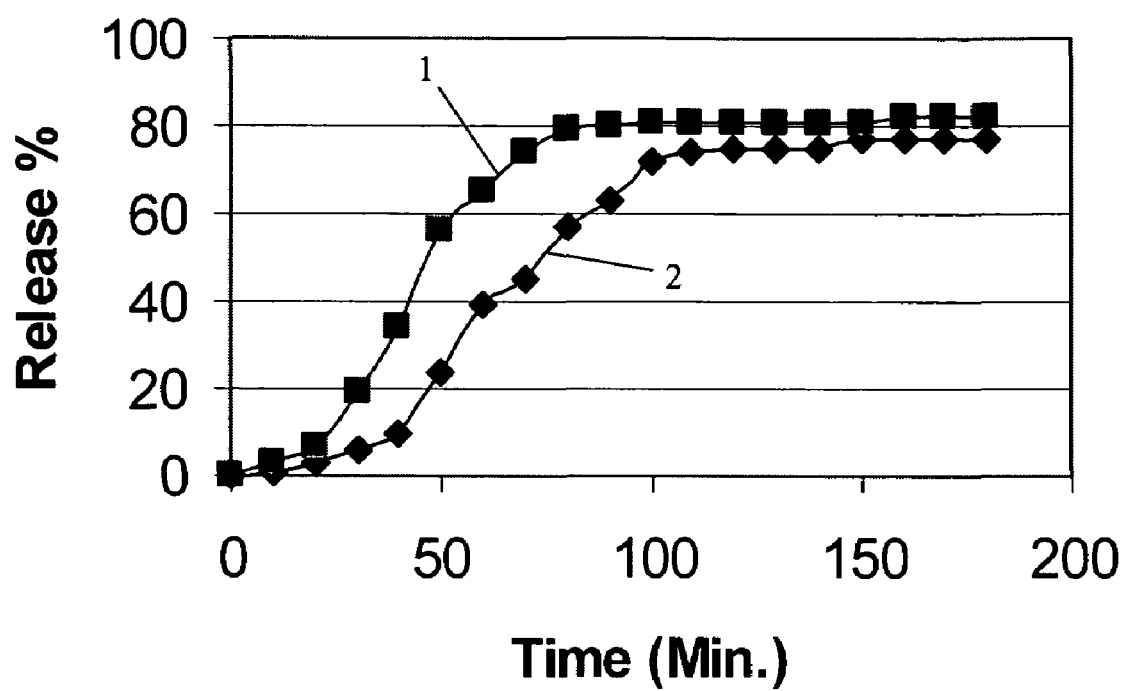
FIG. 2 shows crosslinking agents release rates in accordance with embodiments of the invention.

The amount of the resins used relative to the crosslinking agents may have an effect on the rates of release of the crosslinking agents. Some embodiments of the invention may have about 10% to about 90% (by weight of the total mixture weight) of the crosslinking agents encapsulated in a resin that accounts for about 90% to about 10% by weight of the total mixture. For example, FIG. 2 shows a slow release effect of a polymer modified asphalt. As shown, an encapsulated system formed of 15% resin and 85% sulfur (crosslinking agent) (curve 1) is more readily released, as compared to the system formed of 20% resin and 80% sulfur (curve 2). The thermoset polymer network is degraded by heating at 180° C. However, not all crosslinking agents are released under this condition, i.e., the maximum release of the crosslinking agents in this case is around 80%, as shown in FIG. 2. This result suggests that a temperature higher than 180° C. may be necessary, e.g., 200° C., to completely release the crosslinking agents.

The slow release system in accordance with embodiments of the invention change the kinetics of the vulcanization reaction, making only a small amount of crosslinking agent available at the beginning of the reaction. This avoids the initial burst and the subsequent uncontrolled slow reactions. The altered kinetics of the vulcanization may lead to a different pattern of vulcanization bridges with improved mechanical properties as illustrated in Table 1.

TABLE 1

Comparison of Properties of Various Asphalts

| | Neat Asphalt AC-20 | 9% SBS T161B | 9% SBS + 0.02% Sulfur | 9% SBS + 0.02% Sulfur Slow Release at 80% Active |
|---|---|---|---|---|
| Brookfield Viscosity at 160° C. (cps) | 85 | 1260 | 1540 | 1510 |
| Ring and Ball Softening Point (° C.) | 36 | 98 | 102 | 108 |
| Penetration at 25° C. (dmm) | 80 | 38 | 36 | 35 |
| Cold Bend Resistance (° C.) | 2° C. | 4° C. below 0 | 7° C. below zero | 9° C. below zero |

Table 1 shows that results from a product produced with a method of the invention, i.e., 9% SBS+0.02% sulfur in a slow release system that comprises 80% sulfur and 20% silicon rubber. The properties of this product is compared with three other products produced with conventional methods. It is apparent from Table 1 that the product produced by a controlled vulcanization in accordance with one embodiment of the invention has improved properties: improved viscosity, higher softening point, more resistant to penetration and a lower temperature for cold bend resistance.

Advantages of the invention include one of more of the following. A method of invention can provide crosslinking polymer encapsulation that improves the vulcanization process by changing the rates of the vulcanization. As a result, reaction kinetics and perhaps the type of chemical bonds formed in vulcanization are modified, leading to products with more desirable properties (see Table 1). A system in accordance with embodiments of the present invention may have application in any vulcanization process where a controlled delivery of crosslinking agents is desirable.

While the invention has been described with respect to a limited number of embodiments, those skilled in the art, having benefit of this disclosure, will appreciate that other embodiments can be devised which do not depart from the scope of the invention as disclosed herein. For example, while the above examples use asphalts and silicon rubber vulcanization to illustrate embodiments of the invention, one of ordinary skill in the art would appreciate that embodiments of the invention can be used in any application that can benefit from a controlled release of a crosslinking agent. Accordingly, the scope of the invention should be limited only by the attached claims.

What is claimed is:

1. A method for encapsulating a crosslinking agent in a polymer network, comprising:
    dispersing the crosslinking agent in a solvent;
    adding an uncured resin to the solvent with the crosslinking agent dispersed therein, wherein the uncured resin is an auto cure resin that requires no initiator to initiate a curing process; and
    curing the uncured resin to form the polymer network after the adding of the uncured resin.

2. The method of claim 1, wherein the crosslinking agent is one selected from sulfur, sulfur donor, and peroxide.

3. The method of claim 1, wherein the polymer network comprises a thermoset polymer.

4. The method of claim 1, wherein the uncured resin is one selected from acrylic resin, ethylene resin, silanol resin, and silicon rubber resin.

* * * * *